May 6, 1924.

C. MURNANE 1,493,220

POWER TRANSMISSION GEAR FOR FARM TRACTORS

Filed Nov. 30, 1923

Inventor
Cornelius Murnane
By
his attorneys.

Patented May 6, 1924.

1,493,220

UNITED STATES PATENT OFFICE.

CORNELIUS MURNANE, OF MELBOURNE, VICTORIA, AUSTRALIA.

POWER-TRANSMISSION GEAR FOR FARM TRACTORS.

Application filed November 30, 1923. Serial No. 677,685.

*To all whom it may concern:*

Be it known that I, CORNELIUS MURNANE, a British subject, residing at Melbourne, Australia, have invented an Improved Power-Transmission Gear for Farm Tractors, of which the following is a specification.

This invention relates to power transmission gearing for farm tractors; my object being to provide farm tractors with an improved power transmission gear of the friction type which is of a simple and economical character and adapted to be driven from either or both ends of the engine crank shaft in such a manner that said tractor can be propelled and steered in either direction at a high or at a low speed or be brought to rest at will.

According to my invention, I employ a vertical engine of the reversible type whose cylinder is provided at each side thereof with a fixed stub shaft extending outwardly over the ends of the engine crank shaft, and each of the stub shafts carries a loosely mounted eccentric bushing upon which is loosely mounted a large two-speed friction wheel between whose internal and external friction faces a friction pinion fixed on the corresponding end of the engine crank shaft is adapted to rotate, while each of the eccentric bushings is provided with a hand-lever by which it is free to be rocked on its stub shaft and so simultaneously rock its corresponding two-speed friction wheel as to bring either its internal or external friction face into engagement with its corresponding friction pinion or into a neutral position relative to said pinion. The hubs of the two-speed friction wheels are each formed with a sprocket wheel for transmitting the power to the final gears of the tractor; the arrangement being such that on bringing the internal friction faces of the two-speed friction wheels into engagement with the friction pinions a high speed drive in either direction is obtainable, and on bringing the external friction faces of the two-speed friction wheels into engagement with the friction pinions a low speed drive in either direction results, while on placing the two-speed friction wheels in a neutral position relative to the friction pinions no drive will be imparted.

In order that the invention may be clearly understood, I will proceed to describe the same with reference to the accompanying drawings; wherein:—

Figure 1:
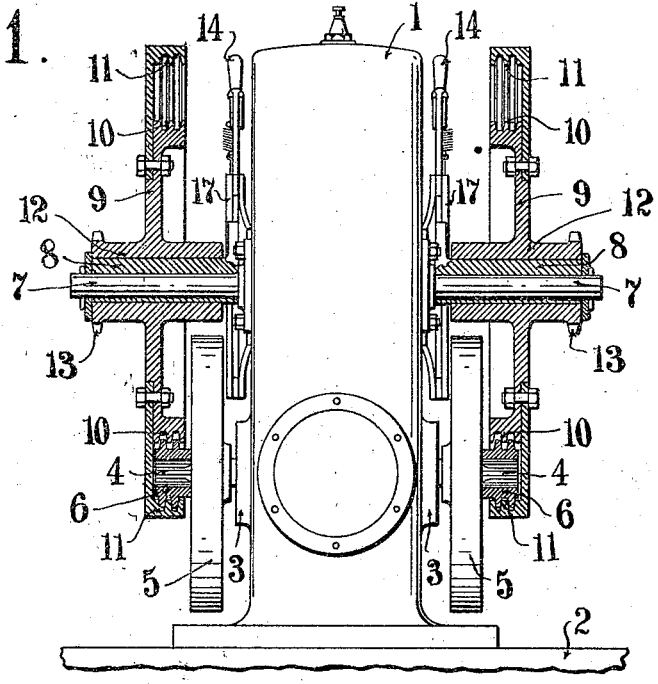
Figure 2:
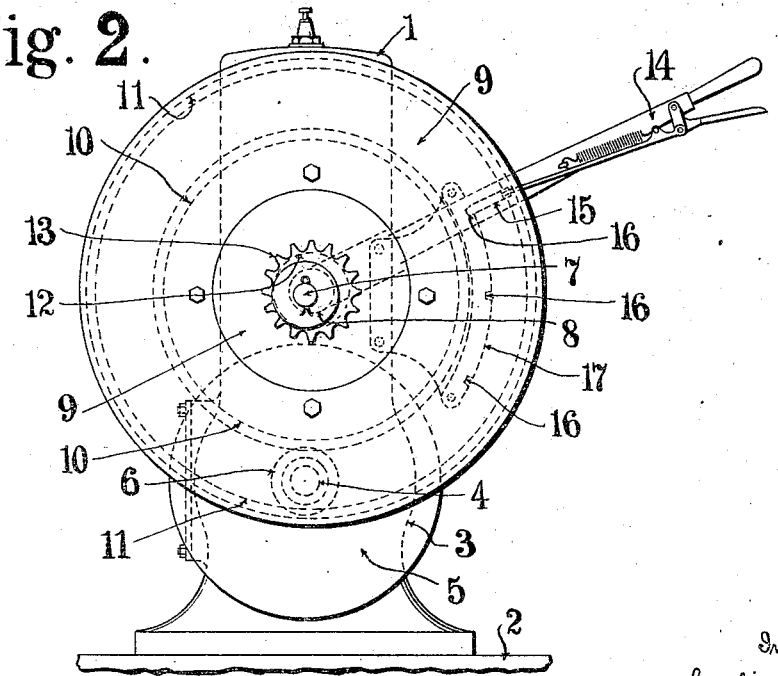

Figs. 1 and 2 are respectively a part sectional front elevation and a side elevation of a vertical internal combustion engine with the improved power transmission gear for the tractor.

Referring to the drawings, the vertical combustion engine 1 is mounted on a frame portion 2 of the tractor (not shown) and comprises a crank casing 3 whose crank shaft 4 projects at both ends and carries the flywheels 5, while outside the latter and on the projecting ends of the crank shaft 4 are keyed grooved friction pinions 6. To the opposite sides of the engine cylinder are bolted flanged stub shafts 7 which extend outwardly over the projecting ends of the crank shaft 4 and carry loosely mounted eccentric bushings 8 upon which are loosely mounted large wheels 9 each having an internal grooved friction face 10 and an external grooved friction face 11 between which the grooved friction pinion 6 on the corresponding end of the crank shaft 4 is adapted to rotate, while the hubs 12 of the said wheels 9 are formed with sprocket wheels 13 for transmitting the power to the final gears of the tractor. Each of the eccentric bushings 8 is provided with a hand-lever 14 by which it is free to be rocked on its stub shaft 7 into any one of three positions under the control of a spring-loaded and trigger-operated pawl 15 carried on said hand-lever 14 and adapted to engage any one of three positioning notches 16 of a rack 17 fixed on the side of the engine cylinder.

When the hand-levers 14 are in the top position with their pawls 15 in engagement with the top notches 16 of the racks 17, the two-speed friction wheels 9 are, through their bushings 8, in the positions indicated in the drawings with their external grooved friction faces 11 in engagement with their corresponding grooved friction pinions 6 on the opposite ends of the driven crank shaft 4, whereby a low speed drive of the final gears of the tractor is obtainable in either direction according to the direction of rotation of the engine crank shaft 4. On moving the hand-levers 14 downwardly and causing their pawls 15 to engage the central notches 16 of the racks 17, the eccentric bushings 8 are rocked on their stub shafts 7 so as to cause the two-speed friction wheels 9 to be rocked into a neutral position and free their external grooved friction faces 11 from engagement with their corresponding grooved friction pinions 6; while on the hand-levers 14 being further depressed so as to bring their pawls 15 into engagement with the bottom notches 16 of the racks 17, the eccentric bushings 8 and their two-speed friction wheels 9 are rocked on their stub shafts 7 so as to bring the internal grooved friction faces 10 of the said wheels 9 into engagement with their corresponding grooved friction pinions 6 on the opposite ends of the driven crank shaft 4, whereby a high speed drive of the final gears of the tractor is obtainable in either direction according to the direction of rotation of the engine crank shaft 4.

It will thus be seen that by suitably manipulating the hand-levers 14, any of the friction faces of the two-speed friction wheels 9 can be brought into engagement with their corresponding friction pinions 6 either separately or together and so cause the tractor to be propelled either forward or backward and steered in any direction; while by placing one hand-lever 14 at the top position and the other hand-lever 14 at the bottom position, the engagement of the two-speed friction wheels 9 with their corresponding friction pinions 6 will be such as to cause the sprocket wheels 13 and their final gears (not shown) to be driven in opposite directions and so steer the tractor on a very short radius.

What I claim as my invention, and desire to secure by Letters Patent is:—

1. A power transmission gear of the friction type for farm tractors, comprising in combination, a vertical reversible engine, a stub shaft fixed at each side of the engine cylinder extending outwardly over the ends of the engine crank shaft, a loosely mounted eccentric bushing on each stub shaft, a large two-speed friction wheel loosely mounted on each eccentric bushing provided with sprocket wheels for transmitting the power to the final gears of the tractor, a friction pinion fixed on each end of the engine crank shaft adapted to rotate between the internal and external friction faces of the corresponding two-speed friction wheels, and a hand-lever on each eccentric bushing adapted to rock the latter on its stub shaft and so simultaneously rock its corresponding two-speed friction wheel as to bring either its internal or external friction face into engagement with its corresponding friction pinion or into a neutral position relative to said pinion.

2. A power transmission gear of the friction type for farm tractors, comprising in combination, a vertical reversible engine, a stub shaft fixed at each side of the engine cylinder extending outwardly over the ends of the engine crank shaft, a loosely mounted eccentric bushing on each stub shaft, a large two-speed grooved friction-faced wheel loosely mounted on each eccentric bushing provided with sprocket wheels for transmitting the power to the final gears of the tractor, a grooved friction-faced pinion fixed on each end of the engine crank shaft adapted to rotate between the internal and external grooved friction faces of the corresponding two-speed friction wheels, and a hand-lever on each eccentric bushing adapted to rock the latter on its stub shaft and so simultaneously rock its corresponding two-speed friction wheel as to bring either its internal or external grooved friction face into engagement with its corresponding grooved friction-faced pinion or into a neutral position relative to said pinion.

In witness whereof I have hereunto set my hand in the presence of two witnesses.

CORNELIUS MURNANE.

Witnesses:
 JOHN JOWETT,
 CYRIL BELLAMY.